US011416682B2

(12) United States Patent
Patel et al.

(10) Patent No.: US 11,416,682 B2
(45) Date of Patent: Aug. 16, 2022

(54) EVALUATING CHATBOTS FOR KNOWLEDGE GAPS

(71) Applicant: International Business Machines Corporation, Armonk, NY (US)

(72) Inventors: Hima Patel, Bengaluru (IN); Jayachandu Bandlamudi, Guntur (IN); Kuntal Dey, Vasant Kunj (IN); Daivik Swarup Oggu Venkata, Amherst, MA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 16/918,048

(22) Filed: Jul. 1, 2020

(65) Prior Publication Data
US 2022/0004715 A1 Jan. 6, 2022

(51) Int. Cl.
*G06F 40/295* (2020.01)
*H04L 51/02* (2022.01)
*G06N 3/04* (2006.01)

(52) U.S. Cl.
CPC ......... *G06F 40/295* (2020.01); *G06N 3/0445* (2013.01); *H04L 51/02* (2013.01)

(58) Field of Classification Search
CPC .... G06F 40/295; G06F 40/279; G06F 40/289; G06F 40/284; G06F 16/35; G06F 40/35; G06N 3/0445; H04L 51/02
See application file for complete search history.

(56) References Cited

U.S. PATENT DOCUMENTS

| 8,949,377 | B2 | 2/2015 | Makar | |
| 9,378,459 | B2 | 6/2016 | Skiba | |
| 10,657,330 | B2* | 5/2020 | Zhang | G06F 40/295 |
| 10,909,154 | B2* | 2/2021 | Yamamoto | G06F 40/134 |
| 11,170,161 | B2* | 11/2021 | Goyal | H04L 51/02 |
| 2006/0224383 | A1* | 10/2006 | Lee | G10L 15/1815 |
| | | | | 704/E15.024 |
| 2014/0122618 | A1 | 5/2014 | Duan | |
| 2016/0314114 | A1* | 10/2016 | Barbetta | G06F 16/3326 |
| 2018/0046706 | A1* | 2/2018 | Yamamoto | G06F 16/3344 |
| 2018/0097749 | A1* | 4/2018 | Ventura | H04L 51/16 |
| 2018/0113939 | A1* | 4/2018 | Chen | G06F 16/951 |
| 2018/0285413 | A1 | 10/2018 | Vora | |
| 2019/0155947 | A1* | 5/2019 | Chu | G06N 5/04 |
| 2019/0171758 | A1* | 6/2019 | Pinel | G06F 16/3329 |

(Continued)

OTHER PUBLICATIONS

Du et al., "Harvesting Paragraph-Level Question-Answer Pairs from Wikipedia", Proceedings of the 56th Annual Meeting of the Association for Computational Linguistics (Long Papers), pp. 1907-1917, Melbourne, Australia, Jul. 15-20, 2018, © 2018 Association for Computational Linguistics, 11 pages.

(Continued)

*Primary Examiner* — Abdelali Serrou
(74) *Attorney, Agent, or Firm* — Stephen R. Yoder

(57) ABSTRACT

Knowledge gaps in a chatbot are identified with reference to a domain-specific document and a set of QA pairs of the chatbot. Entities and/or entity values associated with the document are compared to the entities and/or entity values of the QA pairs. Entities of the document not associated with the QA pairs are identified as knowledge gaps. The QA pairs and knowledge gaps are ranked by relevance to the domain.

18 Claims, 6 Drawing Sheets

(56) References Cited

U.S. PATENT DOCUMENTS

2019/0377824 A1   12/2019  Wang
2020/0007474 A1    1/2020  Zhang

OTHER PUBLICATIONS

Jain et al., "Evaluating and Informing the Design of Chatbots", Session 18: Interacting with Conversational Agents, DIS 2018, Jun. 9-13, 2018, Hong Kong, Copyright © 2018 ACM, 12 pages.

Sedoc et al., "ChatEval: A Tool for Chatbot Evaluation", Proceedings of NAACL-HLT 2019: Demonstrations, Minneapolis, Minnesota, Jun. 2-Jun. 7, 2019, © 2019 Association for Computational Linguistics, 6 pages.

Wang et al., "Semi-supervised Clustering for Short Text via Deep Representation Learning", Proceeding, of the 20th SIGNLL Conference on Computational Natural Language Learning (CoNLL), Berlin, Germany, Aug. 7-12, 2016. © 2016 Association for Computational Linguistics, 9 pages.

\* cited by examiner

EVALUATING CHATBOTS FOR KNOWLEDGE GAPS

BACKGROUND

The present invention relates generally to the field of question-answering systems, and more particularly to evaluating chatbot knowledge.

A cognitive chatbot is a software application used to conduct an on-line chat conversation via text or text-to-speech, in lieu of providing direct contact with a live human agent. Designed to convincingly simulate the way a human would behave as a conversational partner, chatbot systems typically require continuous tuning and testing. Chatbots are typically used in dialog systems, or question answering systems, for various purposes including: (i) customer service, (ii) request routing, and (iii) information gathering. While some chatbot applications use extensive word-classification processes, natural language processors, and sophisticated artificial intelligence (AI), other systems scan for general keywords and generate responses using common phrases obtained from an associated library or knowledge base.

A deep learning chatbot is a cognitive chatbot that learns through a deep learning process that is enabled with machine learning algorithms. A deep learning chatbot learns from access to a document corpus. A chat log is an archive of transcripts from chatbot conversations. Many chat applications allow for the client-side archiving of online chat conversations, while some chat clients allow for the saving of chat archives on a server for future retrieval and analysis.

Long short-term memory (LSTM) is an artificial recurrent neural network (RNN) architecture used in the field of deep learning. LSTM networks include feedback connections and can process entire sequences of data, such as speech or video. For example, LSTM networks are applicable to tasks such as unsegmented, connected handwriting recognition, speech recognition, and anomaly detection in network traffic.

Domain knowledge is knowledge of a specific, specialized discipline or field. In contrast, general knowledge, or domain-independent knowledge refers to a much broader scope of knowledge. The term "domain knowledge" is often used in reference to a more general discipline as, for example, in describing a developer who has general knowledge of programming and domain knowledge about the pharmaceutical industry. Specialists or experts in a field of study are often referred to as having domain knowledge.

Text clustering is a fundamental problem in the fields of text mining and information retrieval. Clustering groups similar texts together such that texts within a cluster are more similar to texts in other clusters. Usually, a text document is represented as a bag-of words or a term frequency-inverse document frequency (TF-IDF) vector, and then a k-means algorithm is performed to partition a set of texts into homogeneous groups. The words of a text document are defined as "entities" for which the specific words are entity values. Examples of entities include: (i) location names; (ii) people names; and/or (iii) dates. A cluster centroid is the middle of a cluster. A centroid is a vector that contains one number for each variable, where each number is the mean of a variable for the entities in that cluster. The cluster centroid can be thought of as the multi-dimensional average of the cluster. The cluster centroid can be used as a general measure of cluster location and to help interpret each cluster. Each centroid can be seen as representing the "average observation" within a cluster across all the variables in the analysis.

Rhetorical structure theory (RST) is often used in text summarization and addresses text organization by means of relations that hold between parts of text. It explains coherence by postulating a hierarchical, connected structure of texts. Rhetorical relations or coherence relations or discourse relations are paratactic (coordinate) or hypotactic (subordinate) relations that hold across two or more text spans. It is widely accepted that notion of coherence is through text relations like this. RST using rhetorical relations provide a systematic way for an analyst to analyze the text.

Before deploying a chatbot into production an expert in the field typically signs off on the chatbot as being ready for deployment to consumers. For this reason, it is important that experts tasked with chatbot approval are confident about the knowledge extracted from a knowledge base for which the chatbot is to be deployed. Some embodiments of the present invention address the problem of how to automatically evaluate chatbots to facilitate expert approval and ensure a confident decision.

SUMMARY

In one aspect of the present invention, a method includes: (i) identifying within a document a set of text portions and corresponding document entities; (ii) classifying each text portion of a subset of text portions according to a binary classification scheme to establish classified text portions within the set of text portions; (iii) associating non-classified text portions with classified text portions according to document entities corresponding to the text portions; (iv) classifying the non-classified text portions according to associations with classified text portions; (v) identifying a set of document entities associated with text portions having a first classification; (vi) determining a set of chatbot entities associated with question-answer pairs formed by a chatbot; and (vii) identifying gap entities present within the set of document entities and not present within the set of chatbot entities. The gap entities represent the knowledge gaps of the chatbot. This method automatically identifies knowledge gaps in a chatbot prior to approval and deployment.

In another aspect of the present invention, a computer program product includes instructions causing a processor to perform a method including: (i) identifying within a document a set of text portions and corresponding document entities; (ii) classifying each text portion of a subset of text portions according to a binary classification scheme to establish classified text portions within the set of text portions; (iii) associating non-classified text portions with classified text portions according to document entities corresponding to the text portions; (iv) classifying the non-classified text portions according to associations with classified text portions; (v) identifying a set of document entities associated with text portions having a first classification; (vi) determining a set of chatbot entities associated with question-answer pairs formed by a chatbot; and (vii) identifying gap entities present within the set of document entities and not present within the set of chatbot entities. The gap entities represent the knowledge gaps of the chatbot. The method automatically identifies knowledge gaps in a chatbot prior to approval and deployment.

In yet another aspect of the present invention, a computer system having a processor set includes instructions causing the processor set to perform a method including: (i) identifying within a document a set of text portions and corresponding document entities; (ii) classifying each text portion of a subset of text portions according to a binary classification scheme to establish classified text portions within the set of text portions; (iii) associating non-classified text portions with classified text portions according to document entities corresponding to the text portions; (iv) classifying the non-classified text portions according to associations with classified text portions; (v) identifying a set of document entities associated with text portions having a first classification; (vi) determining a set of chatbot entities associated with question-answer pairs formed by a chatbot; and (vii) identifying gap entities present within the set of document entities and not present within the set of chatbot entities. The gap entities represent the knowledge gaps of the chatbot. The method automatically identifies knowledge gaps in a chatbot prior to approval and deployment.

In still yet another aspect of the present invention, a method, a computer program product, and a system include: (i) sorting the set of text portions by corresponding document entities; and (ii) selecting the subset of text portions to include each document entity represented in the set of text portions. These method steps advantageously limit the number of text portions to be reviewed and labeled by reference common entity representation.

In still yet another aspect of the present invention, a method, a computer program product, and a system include: (i) correlating each identified gap entity with a set of entities relevant to a first field of study; (ii) determining a relevance value for each identified gap entity based on a degree of correlation to the first field of study; and (iii) displaying a list of the identified gap entities ordered according to the relevance value of each gap entity. The document contains data about the first field of study. In this way, the identified knowledge gaps are based on a particular field of study making it highly favorable to automatically bootstrapped chatbots created from a domain-specific document corpus so that the focus is on the particular field of study.

In still yet another aspect of the present invention, a method, a computer program product, and a system include determining to approve the chatbot based on the number of gap entities being below a threshold count. Determining approval advantageously eliminates the need for an expert to approve the chatbot.

DETAILED DESCRIPTION

Figure 1:
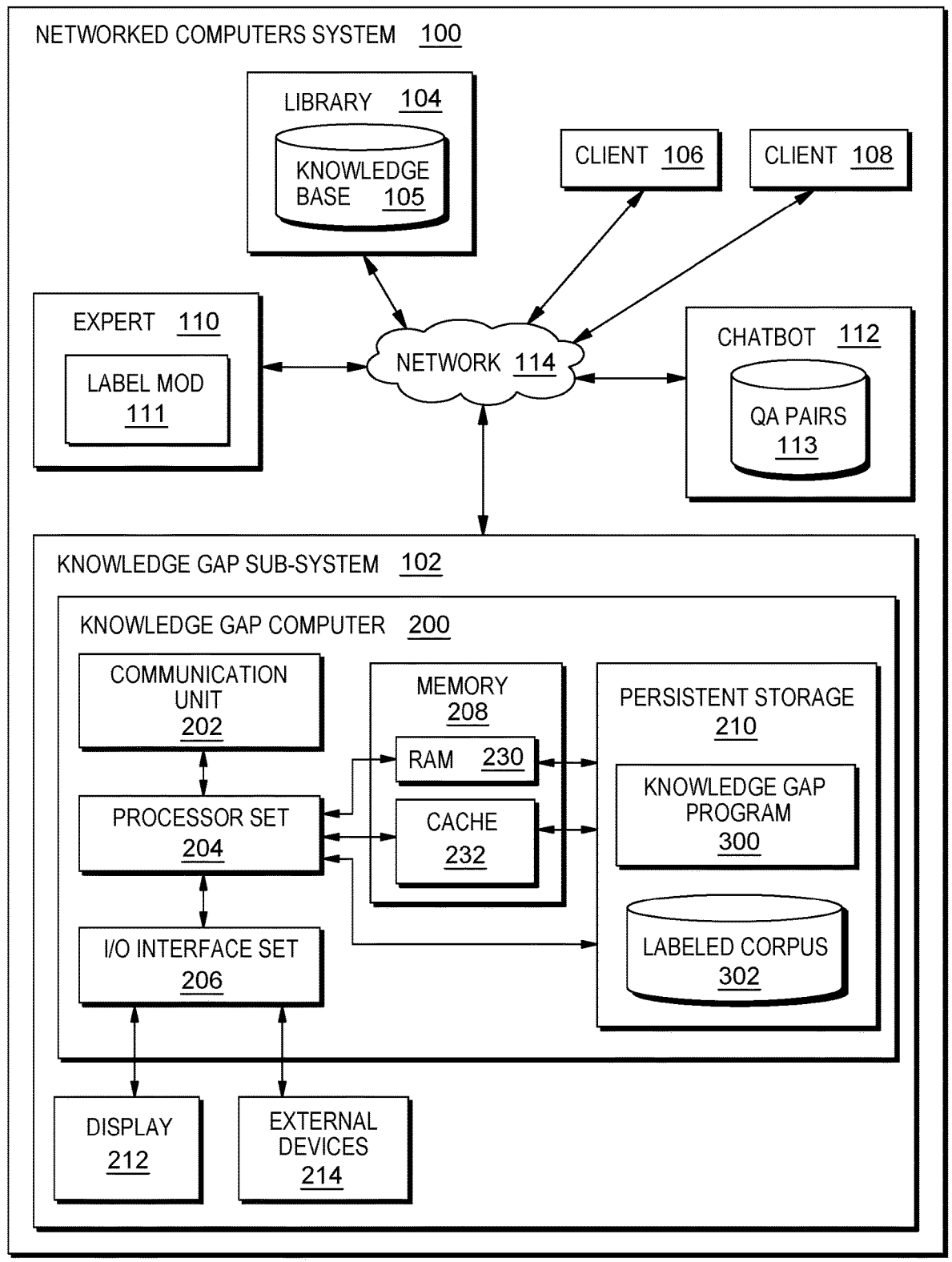
FIG. 1 is a schematic view of a first embodiment of a system according to the present invention.

Knowledge gaps in a chatbot are identified with reference to a domain-specific document and a set of QA pairs of the chatbot. Entities and/or entity values associated with the document are compared to the entities and/or entity values of the QA pairs. Entities of the document not associated with the QA pairs are identified as knowledge gaps. The QA pairs and knowledge gaps are ranked by relevance to the domain. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: knowledge gap sub-system 102; library sub-system 104; knowledge base 105; client sub-systems 106, 108; expert sub-system 110; label module 111; chatbot sub-system 112; question-answer (QA) pairs store 113; communication network 114; knowledge gap computer 200; communication unit 202; processor set 204; input/output (I/O) interface set 206; memory device 208; persistent storage device 210; display device 212; external device set 214; random access memory (RAM) devices 230; cache memory device 232; knowledge gap program 300; and labeled corpus store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

According to some embodiments of the present invention a knowledge gap is where useful information present in a document is not extracted as a QA pair or where a chatbot has not derived a QA pair. In that way, the information is not made available to the chatbot as useful information even though it may be considered useful and be identified as a gap in chatbot knowledge.

Knowledge gap program 300 operates to identify knowledge gaps the processed data of a chatbot by comparing question-answer pairs generated by the chatbot with content of useful document portions of a document. The knowledge of the chatbot may be based on the document. The document may be a domain-specific document covering the same domain in which the chatbot is trained. The knowledge gaps may be ranked by relevance to the topic. Further, ranking of the QA pairs may be performed to generate overall ranking of the knowledge gaps and the QA pairs. In some embodiments of the present invention, a highly ranked knowledge gap relative to the ranking of a set of QA pairs results in automatic rejection of the chatbot for deployment to consumers.

Some embodiments of the present invention recognize the following facts, potential problems and/or potential areas for improvement with respect to the current state of the art: (i) before deploying a chatbot into production, subject matter experts (SMEs) will often sign off on a chatbot, if it is ready to be used by consumers; (ii) it is important to have confidence in the knowledge extracted from the documents by the chatbots; (iii) it is cumbersome for SMEs to manually evaluate chatbot systems; (iv) chatbots may be automatically built with reference to a document corpus; (v) the quality of the automatically-built chatbot should be evaluated before presenting the chatbot to consumers; (vi).

According to some embodiments of the present invention, chat logs including QA pairs produced by the chatbot and the knowledge base used by the chatbot support identification of question intent and creation of answers are helpful indicators of "chatbot knowledge." Knowledge gaps are identifiable with reference to the knowledge base or documents associated with a similar topic as the knowledge base. By comparing entities of the chat logs with entities found in domain-specific documents such as the knowledge base or the associated documents, knowledge gaps are determined where found entities are not present in the chat logs. In some embodiments of the present invention, QA pairs formed by the chatbot are the basis for identifying known entities for comparison to found entities in identifying knowledge gaps.

Some embodiments of the present invention are directed to building a knowledge gap evaluation system that evaluates a chatbot for gaps in knowledge. Some embodiments of the present invention evaluation the knowledge gap is performed by identifying paragraphs within a document using clustering techniques to obtain expert annotations for a sample of paragraphs. In some examples, the expert annotations include tags of either "Useful" or "Not Useful" on which a useful QA pair is based. The expert annotations serve as seeds for identifying a group, or cluster, of paragraphs that are likely useful in responding to queries with a particular domain of knowledge. Knowledge gaps are identified by comparing the QA pairs ingested into the chatbot with the paragraphs obtained from the clustering activity.

Some embodiments of the present invention assigned a relevance score to each QA pair and to each identified knowledge gap. Alternatively, relevance scores are only assigned to the identified knowledge gaps. Relevance is a function of the usefulness of the QA pair for a given product with respect to the expert annotations. According to some embodiments of the present invention, sorting QA pairs and knowledge gaps by relevance to the domain topic facilitates manual inspection of the most relevant QA pairs and the most relevant identified knowledge gaps.

Figure 2:
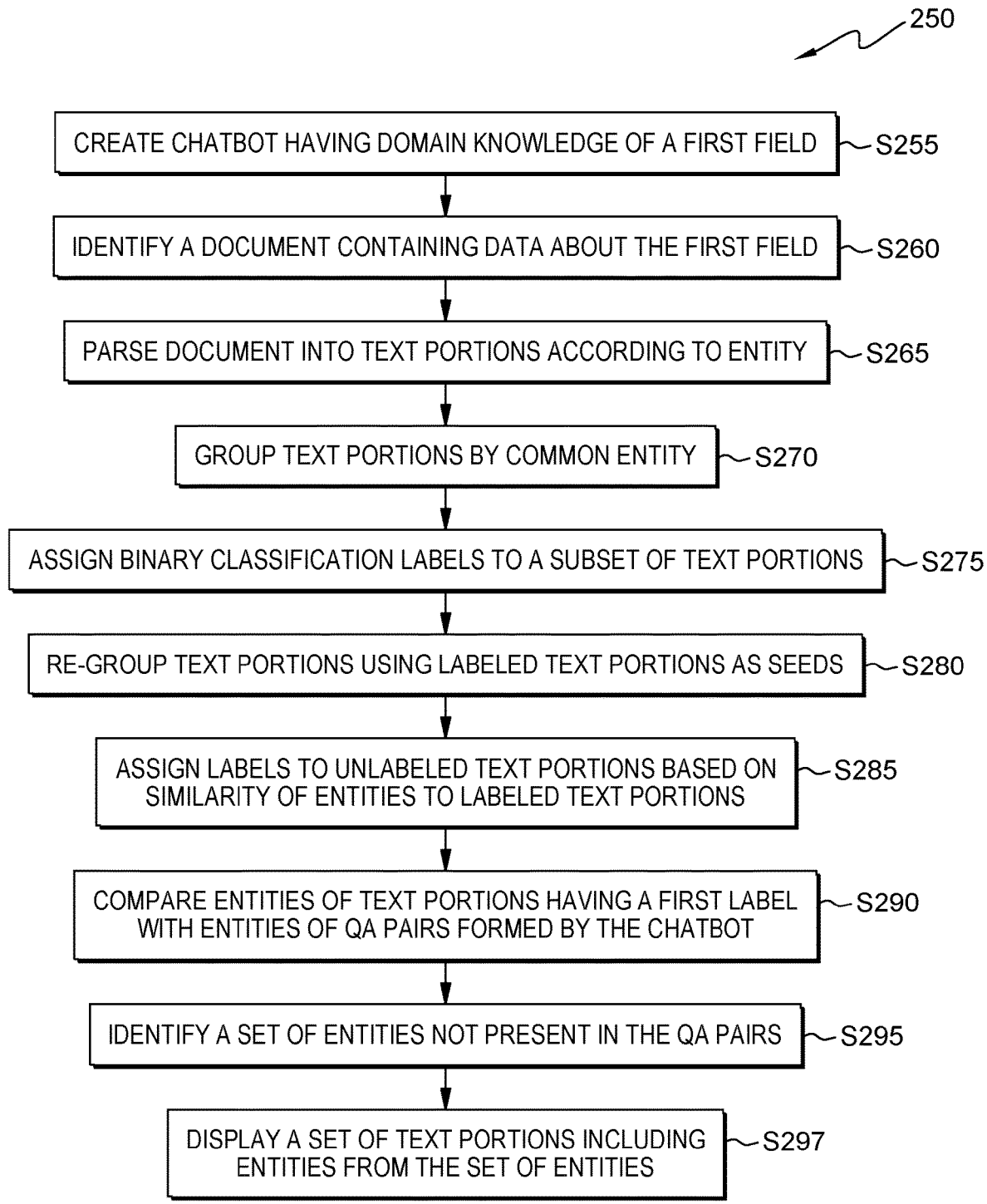
FIG. 2 is a flowchart showing a method performed, at least in part, by the first embodiment system.
Figure 3:
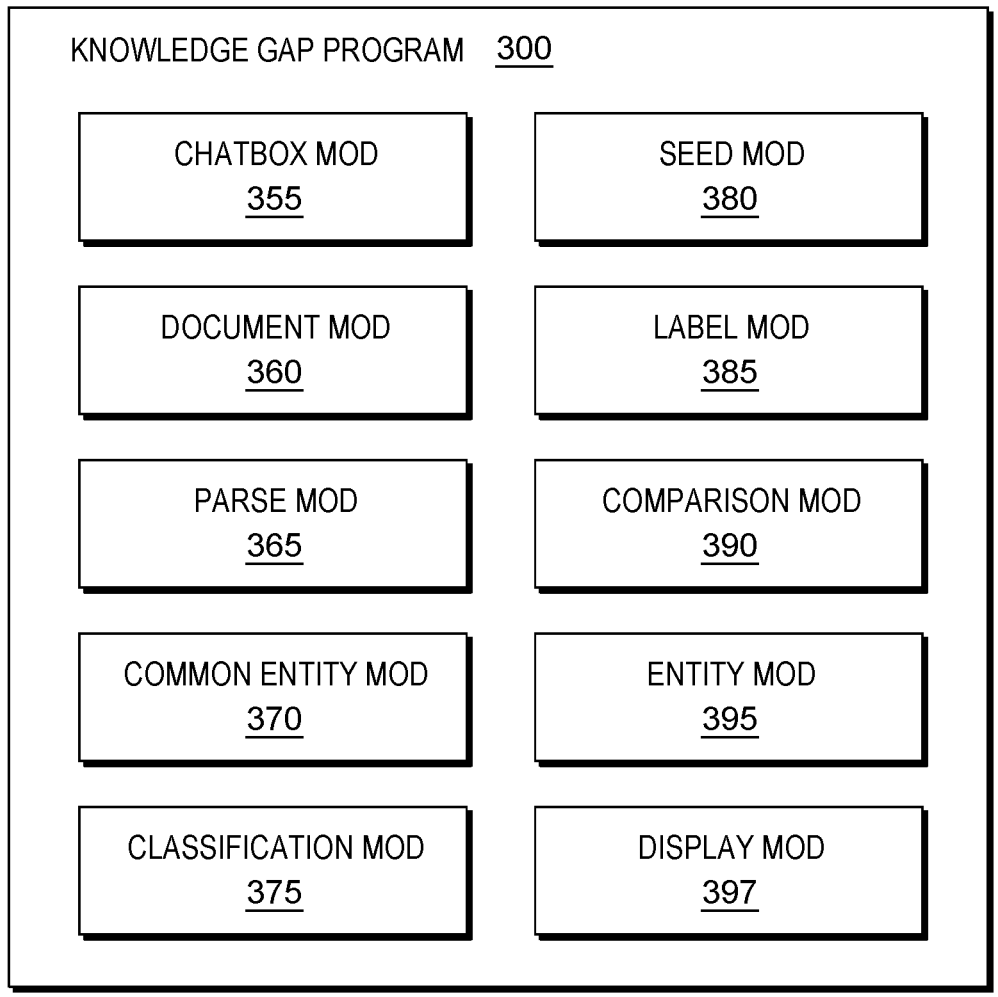
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where chatbot module ("mod") 355 creates a chatbot having domain knowledge of a first field. Chatbots are typically created with reference to documents ingested for processing. The documents include information that is parsed into question-answer (QA) pairs for use during user engagement. The QA pairs are the basis of the "knowledge" of the chatbot with respect to the particular field of study. In this example, chatbot 112 (FIG. 1) ingests documents within knowledge base 105 or library 104 to form QA pairs stored in QA pairs store 113.

Processing proceeds to step S260, where document mod 360 identifies a document containing data about the first field. In this example, a document is identified in library 104 (FIG. 1) that corresponds to the first field for which the chatbot is created. Alternatively, the same document ingested by the chatbot is identified for processing according to embodiments of the present invention. Alternatively, a test document generated for the first field is identified for the purpose of testing the knowledge of chatbots created with domain knowledge of the first field.

Processing proceeds to step S265, where parse mod 365 parses the identified document into text portions according to entity. In this example, the document identified in library 104 (FIG. 1) is parsed by paragraph sections and entity values in the paragraphs are identified. Alternatively, entities associated with each text portion are identified for which values are represented in the text portions. Alternatively, for an identified entity or entity value, the document is parsed into text portions associated with the entity or entity value.

Processing proceeds to step S270, where common entity mod 370 groups text portions by common entity. In this example, the paragraph sections are grouped by represented entity with the paragraphs. For some paragraphs, more than one entity is represented, and the paragraph is duplicated for purposes of grouping by common entity. Alternatively, each text portion including one entity is sorted with other text portions including the one entity such that groups of text portions are established for each represented entity in the document. Alternatively, the text portions are processed for common entity value instead of entity, where the entity is category and the entity name is a member of the category. For example, if location were an entity, then New York City would be an entity name. It should be noted that the term "entity" is often used as either "entity" or "entity name" while the use of "entity name" is always used herein with reference to a pair having an entity and an entity name. That is, when the term "entity name" is used, it should not be taken as the being the same as an "entity."

Processing proceeds to step S275, where classification mod 375 assigns a binary classification label to a subset of text portions. In this example, the classification mod provides a sub-set of paragraphs to expert sub-system 110 for labeling by label mod 111 according to whether the paragraphs are individually useful or unuseful with respect to the entities or entity values associated with the paragraphs. Alternatively, the text portions are selected to represent various entities within the document. The selected text portions, a subset of the text portions, are provided to a user for labeling as useful or unuseful with respect to the corresponding entity represented by the text portion. Alternatively, the binary classification label is "good" and "bad" or "true" and "false" where the label is assigned according to how the text portion relates to the entity for which it represents.

Processing proceeds to step S280, where seed module ("mod") 380 regroups the text portions using the labeled subset of text portions as seeds, or basis, for the regrouping. In this example, the labeled subset of paragraphs is stored in labeled corpus 302 (FIG. 1) for reference when performing the regrouping process. Alternatively, the text portions having labels are identified by corresponding entity and remaining text portions, unlabeled, are associated with the labeled text portions according to their corresponding entities. Alternatively, the labels of the labeled text portions corresponding to the entity names represented by the unlabeled text portions are the labels assigned to the unlabeled text portions.

Processing proceeds to step S285, where label mod 385 assigns binary classification labels to remaining unlabeled text portions based on similarity to entities of the labeled subset of text portions. In this example, the remaining paragraphs are labeled according to the most similar paragraphs in the labeled subset. The complete set of labeled paragraphs is stored in labeled corpus 302. Alternatively, unlabeled text portions in each group of text portions are assigned the more commonly occurring binary label in the group. Where a same count of labels occurs, further grouping is performed to associate each unlabeled text portion with a labeled text portion.

Processing proceeds to step S290, where comparison mod 390 compares entities of text portions having a first label with entities of QA pairs formed by the chatbot. In this example, groups of paragraphs labeled as "useful" serve as the basis from which corresponding entities are collected. The entities associated with groups labeled as useful are compared with entities included in the QA pairs. In this example, the comparison process is simplified in that for each entity in the groups of paragraphs that matches an entity in the QA pairs, the entity is not later reviewed when appearing in another paragraph. Alternatively, text portions within groups labeled with a first classification of the binary classification labels are processed for associated entities. The entities identified are collected and compared with entities represented in the QA pairs formed by the chatbot. The comparison identifies entities represented by both the text portions and the QA pairs. Alternatively, the QA pairs are extracted from the knowledge base ingested by the chatbot. Alternatively, the entities being compared are entity names.

Processing proceeds to step S295, where entity module ("mod") 395 identifies a set of entities not present in the QA pairs. In this example, for any entities of labeled paragraphs that do not match an entity of the QA pairs in QA pairs store 113 (FIG. 1) are recorded to labeled corpus store 302 for later use. Alternatively, for each unmatched entity, the associated text portion is recorded to a database, such as labeled corpus store 302, along with the entity. Each text portion is processed, and unmatched entities are each recorded to the database along with the associated text portions.

Processing ends at step S297, where display mod 397 displays a set of text portions including entities from the set of entities. In this example, display 212 displays the individual paragraphs having entities not matching entities of the QA pairs and the entities are displayed as related to corresponding individual paragraphs. Further, the displayed entities are selectable for operations on selected entities. Alternatively, the identified entities from step S295 are displayed for user selection. When selected the corresponding text portions are displayed with a link to the document from where the text portion was extracted.

Further embodiments of the present invention are discussed in the paragraphs that follow and later with reference to FIGS. 4-7.

Some embodiments of the present invention are directed to a chatbot approval system that automatically evaluates a chatbot for knowledge gaps and presents the knowledge gaps to a user.

Some embodiments of the present invention are directed to chatbot coverage testing to analyze or assess the knowledge curated for the chatbot and identify knowledge gaps exhibited by the chatbot. Further, some embodiments of the present invention allow an expert to provide inputs on what information is important to a particular use cases so that experts may find text in a document for which no QA pairs are generated by the chatbot, thus identifying QA system failures. Some embodiments of the present invention determine to approve a particular chatbot when the identified knowledge gaps are numbered below of threshold value suggesting that relatively few knowledge gaps exist. Alternatively, approval of chatbot is based on expert review of the top one or two knowledge gaps according to a relevance score assigned to the knowledge gaps.

Some embodiments of the present invention are directed to incorporating useful domain constraints and structural properties in performing clustering of document paragraphs or other text portions. Additionally, automated relevance ranking of QA pairs and knowledge gaps are generated for a given knowledge corpus, document, or other domain-specific database.

Once the gaps are identified as paragraphs within the document corpus, some embodiments of the present invention present the gaps to the SME via a graphical use interface (GUI). The chatbot approval system may further provide a relevance ranking to the SME for both he generated QA pairs and the knowledge gaps. The relevance ranking of the knowledge gaps is indicative of the quality of the automatically generated QA pairs. The relevance ranking or relevance score indicates how useful the QA pair is for a given instance of a chatbot targeting a particular domain of knowledge.

Some embodiments of the present invention extract sample paragraphs from a document corpus for a user to label as "useful" or "unuseful." According to some embodiments of the present invention, the paragraphs labeled as "useful" are compared with QA pairs generated by the chatbot with reference to the document corpus. When paragraphs labeled useful contain subject matter not available in the QA pairs, a knowledge gap is identified. Some embodiments of the present invention assign a relevance ranking to the identified knowledge gap.

Some embodiments of the present invention are directed to identifying knowledge gaps in automatically bootstrapped chatbots from documents, whether a document-based chatbot or a retrieval based chatbot or another type of chatbot now know or to be known in the future.

Some embodiments of the present invention are directed to relevance ranking of chatbot knowledge gaps in view of paragraph labels.

Some embodiments of the present invention facilitate expert inputs and/or annotations to content in a knowledge base or document. Further, an expert may identify important knowledge gaps in chatbot coverage of a particular topic according to the expert inputs.

Some embodiments of the present invention are directed to a system that evaluates a chatbot for gaps in knowledge including the steps: (i) allowing a subject matter expert to annotate documents ingested by a chatbot; (ii) identifying gaps in knowledge of the chatbot with QA pairs produced by the chatbot; and/or (iii) ranking by relevance chatbot extracted QA pairs and identified knowledge gaps.

Some embodiments of the present invention are directed to extracting text samples from a document corpus by applying relevant domain constraints to the extraction.

Some embodiments of the present invention are directed to the following workflow: (i) extract text samples from a document corpus for labeling as "useful" or "unuseful;" (ii) compare text samples by label with the chatbot output, which may be presumed to be useful information; (iii) identify useful paragraphs from the document corpus where QA pairs are not extracted and useful paragraphs from which the chatbot has not formed QA pairs.

In some embodiments of the present invention, the document corpus ingested when building the chatbot and from which QA pairs are extracted are inputs to a QA system. Inputs may include: (i) domain-specific documents in a knowledge base; (ii) QA pairs (chatbot output); (iii) documents from which chatbot is built; and (iv) extracted QA pairs from documents.

Figure 4:
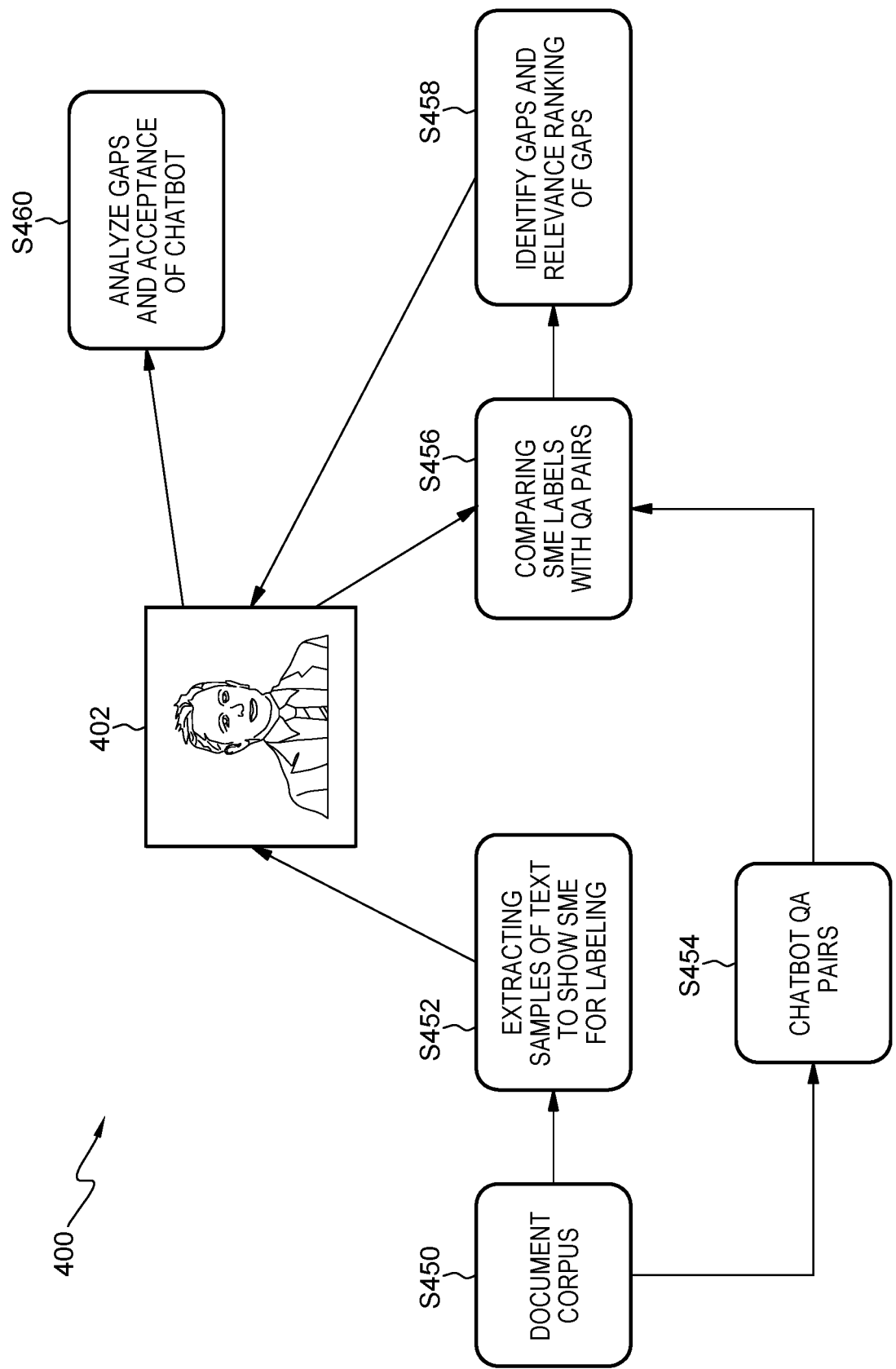
FIG. 4 is a flowchart showing a method performed, at least in part, by the first embodiment system.

FIG. 4 shows flowchart 400 depicting a second method according to an embodiment of the present invention. This method will now be discussed, over the course of the following paragraphs, with extensive reference to FIG. 4 for the method step blocks.

Processing begins at step S450, where program 300 receives a document corpus for a specified domain of knowledge.

Processing proceeds to step S452, where program 300 extracts samples of text from the document corpus to display to subject matter expert 402 for labeling.

Processing proceeds to step S454, where program 300 receives QA pairs generated by an automatically bootstrapped chatbot for the specified domain.

Processing proceeds to step S456, where program 300 compares the labeled text samples with the QA pairs to determine key differences in content.

Processing proceeds to step S458, where program 300 identifies knowledge gaps evident in the QA pairs when compared to content of corresponding text samples and ranks the knowledge gaps by relevance in the specified domain with respect to both the QA pairs and the other text samples. Some embodiments of the present invention display the resulting ranked knowledge gaps to a user, such as subject matter expert 402.

Processing ends at step S460, where program 300 analyzes the ranked knowledge gaps and determines acceptance of the chatbot based on the rank of the various identified knowledge gaps. Some embodiments of the present invention perform step S460 responsive to approval by the user, such as subject matter expert 402.

Some embodiments of the present invention are directed to clustering document paragraphs by assigning labels to each cluster using expert input as labeling seeds. In that way, useful clusters drive the analysis of generated QA pairs and identification of knowledge gaps. According to some embodiments, a display is presented to a user including ranked results of the analysis with document paragraphs not covered by the QA pairs being identified as useful or unuseful with reference to the expert annotation seeds. As will be understood by persons having skill in the art, the sample of expert annotation seed documents should be diverse in scope and/or subject matter. Annotations of "useful" and "unuseful" are discussed herein. Other binary classification labels may be applied within the documents to distinguish the various paragraphs taken from a document.

Some embodiments of the present invention cluster document paragraphs using an extension of the k-means algorithm with additional constraints to optimize the clustering based on domain knowledge and structural properties of the document.

Some embodiments of the present invention use hidden state features generated by a long short-term memory (LSTM) architecture where each word of a paragraph is fed into the LSTM model sequentially and the mean of hidden states over the entire sentence is taken as the final representation vector of the sentence.

According to some embodiments of the present invention constraints, in addition to distance constraints of the k-means algorithm, are added to the optimization algorithm in one or more of the following ways: (i) minimize cost, or loss, if two paragraphs have one or more imperative sentences; (ii) minimize cost if two paragraphs have one or more conditional sentences; (iii) minimize cost if two paragraphs have the same structural type (such as list type, code snippet type, and algorithm); (iv) minimize cost if two paragraphs appear subsequently in the text of a document and are related to each other where relation is found by applying rhetorical structure theory (RST) while looking at relations such as "elaboration."

Some embodiments of the present invention process chunks of text, such as paragraphs, taken from documents according to the following algorithm: (i) randomly initialize cluster centroids and LSTM values; (ii) convert text portion into vector form using the LSTM model; (iii) assign each vector (text chunk such as a paragraph) to nearest cluster centroid using distance and added constraints; (iv) estimate the cluster centroid with reference to the assigned nearest cluster centroid; and (v) update the parameters of the LSTM model using the loss functions, or cost functions, as described above.

Figure 5:
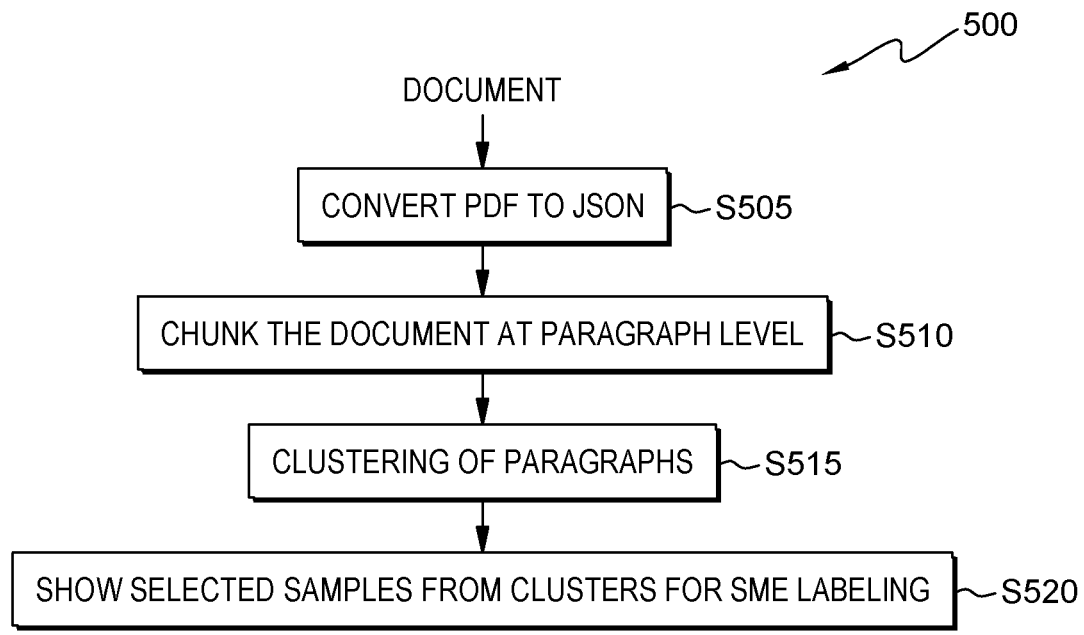
FIG. 5 is a schematic view of a first machine logic (for example, software) portion of the first embodiment system.

FIG. 5 shows flowchart 500 depicting intake processing of documents from a document corpus. This method will now be discussed, over the course of the following paragraphs, with extensive reference to FIG. 5 for the method step blocks.

Processing begins at step S505, where program 300 converts a document received from the document corpus from a pdf format to a JSON (Java Script Object Notation) format. (Note: the term(s) "JAVA," "JAVASCRIPT," and/or "JSON" may be subject to trademark rights in various jurisdictions throughout the world and are used here only in reference to the products or services properly denominated by the marks to the extent that such trademark rights may exist.)

Processing proceeds to step S510, where program 300 divides the document into paragraph level chunks of text.

Processing proceeds to step S515, where program 300 clusters the chunks of text according to subject or focus of the text.

Processing ends at step S520, where program 300 provides a selection of text portions from various clusters to an expert for labeling as "useful" and "unuseful."

Some embodiments of the present invention are directed to computation of a relevance score for QA pairs and/or identified knowledge gaps. Relevance and ranking is often performed by taking additional re-clustering steps as described in the process that follows.

Some embodiments of the present invention are directed to a process including: (i) receiving as input the initially created clusters of text portions with some text portions having labels such as "useful" and "unuseful;" (ii) propagating paragraph labels to initial clusters according to immediate neighborhood of each cluster as defined by a distance threshold to form "weak labeled sets;" (iii) applying a revised clustering algorithm, which is the clustering algorithm discussed above with the additional constraint for weak labeled data identified within the weak labeled sets; (iv) for each of the new clusters formed by application the revised clustering algorithm, label the clusters according to the binary classification labels used, such as "useful" and "unuseful" in this example; and (v) for each labeled text portion, assign a relevance score according to its proximity to the governing cluster centroid for that label (the closer to the centroid, the higher the relevance score). The relevance score is equal to the inverse of the distance from the cluster centroid.

Comparison of the processed document text with the QA pairs output by the chatbot is performed in some embodiments by comparing all text portions that are among the "useful" labeled clusters to all answers from the chatbot-produced QA pairs using fuzzy similarity metrics weighted by the inverse of the relevance score of the text portions. The comparison results in comparison metric scores for each text portion. The text portions having a comparison metric score greater than a pre-defined score threshold are identified as containing knowledge gap data not covered by knowledge of the chatbot.

Figure 6:
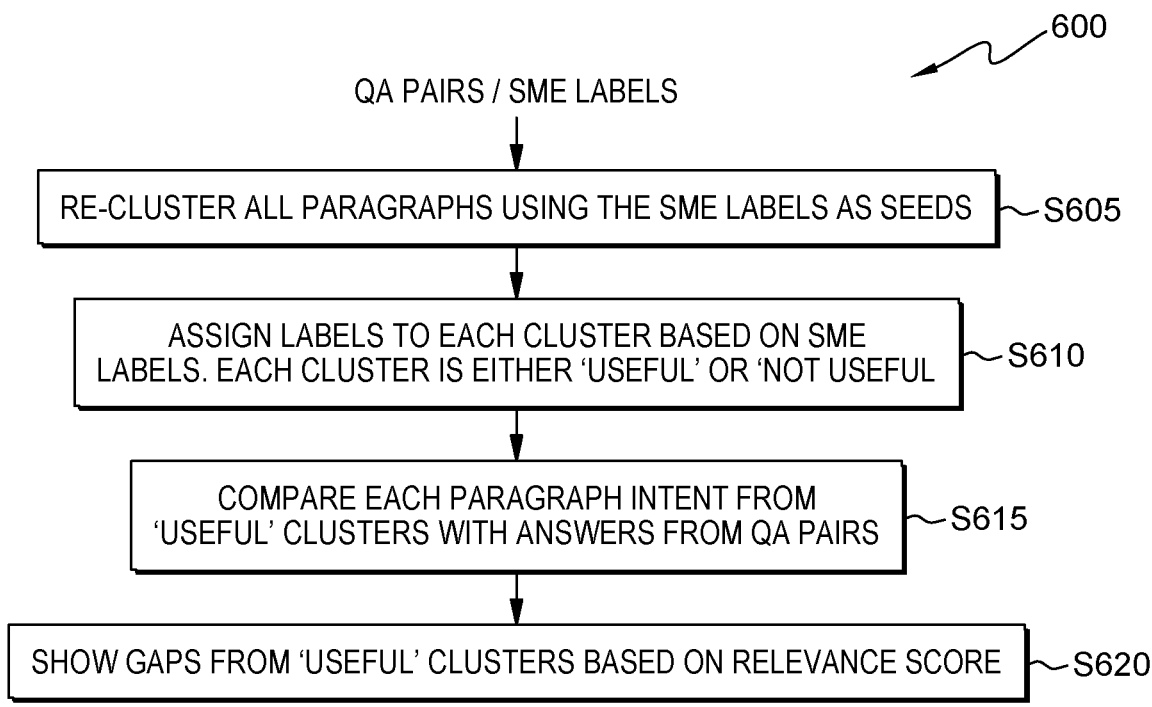
FIG. 6 is a schematic view of a second machine logic (for example, software) portion of the first embodiment system.

FIG. 6 shows flowchart 600 depicting intake processing of documents from a document corpus. This method will now be discussed, over the course of the following paragraphs, with extensive reference to FIG. 6 for the method step blocks.

Processing begins at step S605, where program 300 re-clusters all text portions, or paragraphs, based on similarity to the selected text portions and corresponding labels.

Processing proceeds to step S610, where program 300 assigns labels to each cluster generated in step S605 based on the corresponding labels of similar labeled text portions. In this example, each cluster is assigned a label of "useful" or "unuseful."

Processing proceeds to step S615, where program 300 compares intent of each text portion of "useful" clusters with the intent of answers from QA pairs.

Processing ends at step S620, where program 300 presents to a user the knowledge gaps identified in "useful" clusters with a corresponding relevance score. According to some embodiments of the present invention the relevance score is obtained by correlating the knowledge gaps with respect to a domain of knowledge represented by the document corpus. For each knowledge gap, at least one entity or entity value is identified and cross-referenced with the domain of knowledge, or field of study generally. A relevance value is assigned to each knowledge gap according to a degree of correlation of the entity or entity value with the field of study as supported by the cross-referencing activity. Some embodiment of the present invention display the knowledge gaps and associated entities by order of assigned relevance value.

Figure 7:
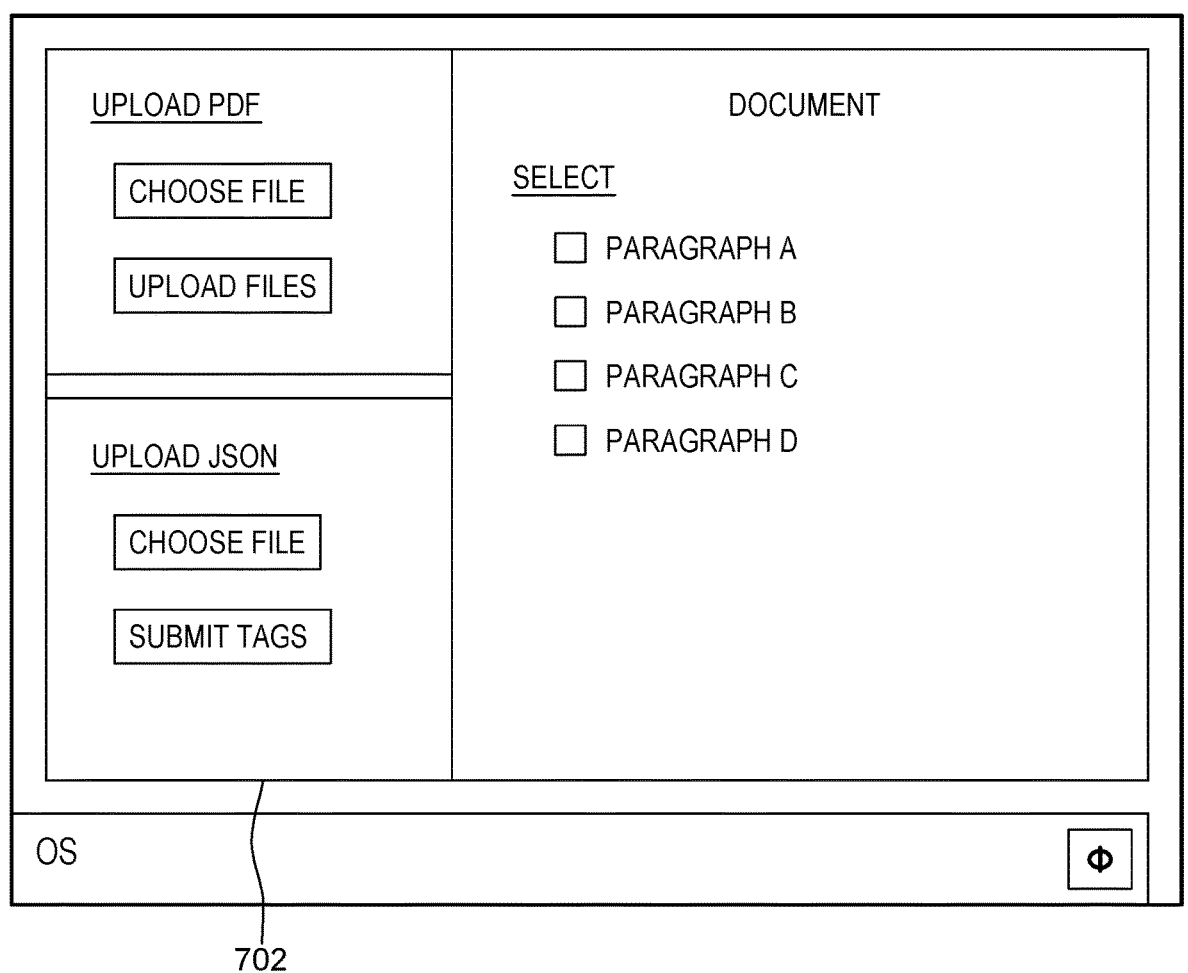
FIG. 7 is a screenshot view showing information that is generated by and/or helpful in understanding embodiments of the present invention.

FIG. 7 shows screenshot 700 depicting user interface 702 for input to a knowledge gap program such as program 300 (FIG. 1). The user interface provides for uploading documents for processing and for submitting labels, or "tags," for specified paragraphs, such as on of Paragraphs A, B, C, and D, in JSON format.

In some embodiments of the present invention, user input applies labels to selected paragraphs according to initial clusters assigned by a knowledge gap program. After labels are applied to the selected paragraphs, the paragraphs of the document are re-clustered drawing from the insight of the labels, which sort the clusters according to a binary filter, such as "useful" and "unuseful."

Some embodiments of the present invention may include one, or more, of the following features, characteristics and/or advantages: (i) evaluates a chatbot for gaps in its knowledge; (ii) automatically evaluates chatbot systems; (iii) analyzes a given chatbot using extracted QA pairs and identifies gaps in knowledge; (iv) relevance rankings for the QA pairs and knowledge gaps are helpful mechanisms by which an automatically built chatbot is evaluated; (v) supports organizational determination of how many human agents to assign for support of product consumers in view of confidence in the chatbot's knowledge of the product; (vi) facilitates determination of the severity level of problem tickets to be handled by a chatbot according to knowledge of a given product; (vii) identifies areas for teaching a chatbot what is not currently within the knowledge of the chatbot; (viii) facilitates routing decisions to which chatbot and when to use a human agent; (ix) addresses the knowledge gaps in the conversation systems and how to test the coverage of the conversation systems; (x) automatically identifies knowledge gaps and evaluates chatbots with minimal expert labeling activity; (xi) identifies gaps accurately based on their relevance and domain applicability; (xii) allows a user to specify domain related constraints during automated evaluation of chatbot; (xiii) knowledge documents are considered for automated gap identification; and/or (xiv) identifies knowledge gaps accurately based on their usefulness and domain applicability.

Some embodiments of the present invention are directed to a method of utilizing a computing device to automatically analyze a chatbot for gaps in knowledge, the method comprising: (i) receiving by a computing device chat logs associated with a chatbot; (ii) extracting by the computing device chat log entities from the chat logs; (iii) receiving by the computing device documents associated with a similar topic as the chatbot; (iv) extracting by the computing device document entities from the documents associated with the similar topic; (v) identifying by the computing device one or more gaps in the chatbot by comparing the document entities and the chat log entities to discover document entities not present in the chat log entities; and (vi) displaying by the computing device the one or more gaps to a user via a graphic user interface.

Some embodiments of the present invention are directed to identifying one or more gaps in chatbot knowledge by extracting document entities from group of documents associated with similar topic and comparing the document entities with the chatbot chat-log entities to discover the document entities that are not present in the chat log entities by a computing device.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
defining a set of cluster centroids in a document using a text-clustering technique;
identifying within the document a set of text portions and corresponding document entities;
classifying each text portion of a subset of text portions according to a binary classification scheme to establish classified text portions within the set of text portions;
converting each classified text portion having a first classification into a text-vector form using a long short-term memory (LSTM) model to generate a set of text vectors;
for each text vector, assigning a first cluster centroid of the set of cluster centroids, the first cluster centroid being nearest to a text vector according to proximity of the text vector to each centroid of the set of cluster centroids;
estimating a second cluster centroid with reference to the assigned first cluster centroid;
updating the LSTM model according to a cost function associated with similarities of the first cluster centroid and the second cluster centroid;
associating a set of non-classified text portions with the set of text vectors of classified text portions having a first classification according to document entities within the set of non-classified text portions;
classifying the set of non-classified text portions with the first classification to establish a reference set of text portions having the first classification including the classified set of non-classified text portion and the set of text vectors;
determining a set of chatbot entities within question-answer pairs formed by ingestion of the document by a chatbot; and
identifying gap entities present within the reference set of text portions and not present within the set of chatbot entities;
wherein:
the gap entities represent the knowledge gaps of the chatbot; and
the binary classification indicates usefulness of the text portion for evaluating the chatbot.

2. The computer-implemented method of claim 1, further comprising:
sorting the set of text portions by corresponding document entities; and selecting the subset of text portions to include each document entity represented in the set of text portions.

3. The computer-implemented method of claim 1, wherein the chatbot has domain knowledge of a first field, the domain knowledge being based on a knowledge base.

4. The computer-implemented method of claim 3, wherein the knowledge base includes the document.

5. The computer-implemented method of claim 1, further comprising:
displaying the identified gap entities and corresponding text portions associated with the identified gap entities.

6. The computer-implemented method of claim 1, further comprising:
correlating each identified gap entity with a set of entities relevant to a first field of study;
determining a relevance value for each identified gap entity based on a degree of correlation to the first field of study; and
displaying a list of the identified gap entities ordered according to the relevance value of each gap entity;
wherein:
the document contains data about the first field of study.

7. The computer-implemented method of claim 1, further comprising:
determining to approve the chatbot based on the number of gap entities being below a threshold count.

8. A computer program product comprising a computer-readable storage medium having a set of instructions stored therein which, when executed by a processor, causes the processor to perform a method comprising:
defining a set of cluster centroids in a document using a text-clustering technique;
identifying within the document a set of text portions and corresponding document entities;
classifying each text portion of a subset of text portions according to a binary classification scheme to establish classified text portions within the set of text portions;
converting each classified text portion having a first classification into a text-vector form using a long short-term memory (LSTM) model to generate a set of text vectors;
for each text vector, assigning a first cluster centroid of the set of cluster centroids, the first cluster centroid being nearest to a text vector according to proximity of the text vector to each centroid of the set of cluster centroids;
estimating a second cluster centroid with reference to the assigned first cluster centroid;
updating the LSTM model according to a cost function associated with similarities of the first cluster centroid and the second cluster centroid;
associating a set of non-classified text portions with the set of text vectors of classified text portions having a first classification according to document entities within the set of non-classified text portions;
classifying the set of non-classified text portions with the first classification to establish a reference set of text portions having the first classification including the classified set of non-classified text portion and the set of text vectors;
determining a set of chatbot entities within question-answer pairs formed by ingestion of the document by a chatbot; and
identifying gap entities present within the reference set of text portions and not present within the set of chatbot entities;
wherein:

the gap entities represent the knowledge gaps of the chatbot; and
the binary classification indicates usefulness of the text portion for evaluating the chatbot.

9. The computer program product of claim 8, wherein the method further comprises:
sorting the set of text portions by corresponding document entities; and
selecting the subset of text portions to include each document entity represented in the set of text portions.

10. The computer program product of claim 8, wherein the chatbot has domain knowledge of a first field, the domain knowledge being based on a knowledge base.

11. The computer program product of claim 10, wherein the knowledge base includes the document.

12. The computer program product of claim 8, wherein the method further comprises:
displaying the identified gap entities and corresponding text portions associated with the identified gap entities.

13. The computer program product of claim 8, wherein the method further comprises:
correlating each identified gap entity with a set of entities relevant to a first field of study;
determining a relevance value for each identified gap entity based on a degree of correlation to the first field of study; and
displaying a list of the identified gap entities ordered according to the relevance value of each gap entity;
wherein:
the document contains data about the first field of study.

14. The computer program product of claim 8, wherein the method further comprises:
determining to approve the chatbot based on the number of gap entities being below a threshold count.

15. A computer system for evaluating chatbots for knowledge gaps, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
defining a set of cluster centroids in a document using a text-clustering technique;
identifying within the document a set of text portions and corresponding document entities;
classifying each text portion of a subset of text portions according to a binary classification scheme to establish classified text portions within the set of text portions;
converting each classified text portion having a first classification into a text-vector form using a long short-term memory (LSTM) model to generate a set of text vectors;
for each text vector, assigning a first cluster centroid of the set of cluster centroids, the first cluster centroid being nearest to a text vector according to proximity of the text vector to each centroid of the set of cluster centroids;
estimating a second cluster centroid with reference to the assigned first cluster centroid;
updating the LSTM model according to a cost function associated with similarities of the first cluster centroid and the second cluster centroid;

associating a set of non-classified text portions with the set of text vectors of classified text portions having a first classification according to document entities within the set of non-classified text portions;

classifying the set of non-classified text portions with the first classification to establish a reference set of text portions having the first classification including the classified set of non-classified text portion and the set of text vectors;

determining a set of chatbot entities within question-answer pairs formed by ingestion of the document by a chatbot; and identifying gap entities present within the reference set of text portions and not present within the set of chatbot entities;

wherein:

the gap entities represent the knowledge gaps of the chatbot; and the binary classification indicates usefulness of the text portion for evaluating the chatbot.

16. The computer system of claim 15, wherein the method further comprises:

sorting the set of text portions by corresponding document entities; and selecting the subset of text portions to include each document entity represented in the set of text portions.

17. The computer system of claim 15, wherein the method further comprises:

correlating each identified gap entity with a set of entities relevant to a first field of study;

determining a relevance value for each identified gap entity based on a degree of correlation to the first field of study; and displaying a list of the identified gap entities ordered according to the relevance value of each gap entity;

wherein:

the document contains data about the first field of study.

18. The computer system of claim 15, wherein the method further comprises:

determining to approve the chatbot based on the number of gap entities being below a threshold count.

* * * * *